US005431868A

United States Patent [19]

Hirano

[11] Patent Number: 5,431,868

[45] Date of Patent: Jul. 11, 1995

[54] VAPOR PHASE ACETYLATION MANUFACTURING METHOD FOR WOOD BOARD

[75] Inventor: Yoshihiro Hirano, Hamamatsu, Japan

[73] Assignee: Yamaha Corporation, Japan

[21] Appl. No.: 99,713

[22] Filed: Jul. 29, 1993

[51] Int. Cl.[6] ............ B29C 43/00

[52] U.S. Cl. ............ 264/83; 264/109; 264/115

[58] Field of Search ............ 264/83, 109, 115

[56] References Cited

U.S. PATENT DOCUMENTS 2,417,995 3/1947 Stamm et al. ............ 428/420

FOREIGN PATENT DOCUMENTS 0213252 11/1987 European Pat. Off. .

OTHER PUBLICATIONS

R. M. Rowell, *Dimensional stability of particleboard made from vapor phase acetylated pine wood chips*, Nordic Pulp and Paper Research Journal No. 2/1986.

Rowell, Tillman & Simonson, *A Simplified Procedure for the Acetylation of Hardwood and Softwood Flakes for Flakeboard Production*, Journal of Wood Chemistry and Technology, 6(3), 427–448(1986).

A. D. Sheen, *The Preparation of Acetylated Wood Fibre on a Commercial Scale*, Chemical Modification of Lignocellulosics, 7–8th Nov. 1992, Rotorua, New Zealand.

Y. Harada, *Proceedings of the International Symposium on Chemical Modification of Wood*, 17–18th May, 1991, Kyoto, Japan.

Y. Nishino, *Simplified Vapor Phase Acetylation of Small Specimens of Hinoki Wood with Acetic Anhydride*, Journal of the Japan Wood Research Society, vol. 37, No. 4, pp. 370–374 (1991).

Suzuki, *Size-stability of Wood Boards*, Wood Science and Utility Engineerings (Report of Study Groups of the Japan Wood Research Society, 1989).

*Primary Examiner*—Allan R. Kuhns

*Attorney, Agent, or Firm*—Ostrolenk, Faber, Gerb & Soffen

[57] ABSTRACT

Wood fibers obtained by the fiberization of wood are acetylated in a vapor phase acetylating agent acetic acid anhydrate or the like. The acetylated fibers are accumulated, and molded into a solid wood board. By means of the manufacturing method of the present invention, it is possible to obtain wood board which exhibits little moisture absorption and water absorption. Furthermore, the acetylation is conducted in the vapor phase acetylating agent, so that the amount of acetylating agent used is greatly reduced in comparison with the case in which the acetylation is conducted in the liquid phase acetylating agent.

13 Claims, 3 Drawing Sheets

A : ACETIC ANHYDRATE
B : ACETIC ANHYDRATE AND XYLINE

VAPOR PHASE ACETYLATION MANUFACTURING METHOD FOR WOOD BOARD

FIELD OF THE INVENTION

The present invention relates to a manufacturing method for wood board, wherein wood fibers constituting the modified wood are acetylated in a vapor phase. These wood fibers are accumulated, and molded, and thereby, modified wood material having little water absorption and superior resistance to moisture is obtained.

BACKGROUND OF THE INVENTION

Wood boards using wood particles or wood fibers as a raw material which are bonded by means of a synthetic resin binder, molded and then formed into a solid body, are known. Wood boards may be classified into particle boards and fiber boards, based on the form of the raw material. The term particle board refers to a board material in which particles of wood produced by the cutting or shaving of raw wood, such as logs or the like, are molded and formed into a solid body by means of a synthetic resin binder. Particles are obtained by the simple cutting or shaving of wood, and such particles are termed "chips" or "flakes", depending on the conditions under which they were produced. On the other hand, fibers having lengths from ones to tens of mm obtained by fiberizing wood are molded and formed into a solid body by means of a binder to obtain a fiber board. Fiber boards are uniform, so that the workability thereof is good. The form thereof is not limited to a flat surface, and the fiber boards can be made into a curved surface, and such boards can be produced in large amounts.

However, both particle boards and fiber boards possess a drawback: they lack a resistance to moisture, in that the thickness of the board varies as a result of the absorption of water after board formation. Various attempts have been made to impart resistance to moisture to such boards by means of the acetylation processing of the wood particle or wood fiber which forms the raw material thereof.

Rowell and Simonson, et. al., dried a lignocellulose material (wood flakes having a predetermined size and jute cloth), immersed these lignocellulose materials in liquid acetic acid anhydrate without the presence of a catalyst, or sprayed this lignocellulose with acetic acid anhydrate, and then maintained this material within a cylinder for a period of from 2 to 8 hours at a temperature of 120° C., and thus conducted acetylation processing (EP-A-213252).

The same Rowell conducted acetylation processing by immersing wood chips having a thickness of approximately 1 mm and a maximum length of 25 mm, which had been dried in advance, in liquid acetic acid anhydrate, and then maintained these chips in liquid acetic acid anhydrate for a period of 4 to 48 hours at a temperature of 120° C. (Nordic Pulp and Paper Research Journal No. 2/1986).

Furthermore, Rowell, et. al., conducted solvent-and-catalyst-free acetylation processing by predrying southern pine flakes (thickness 0.5 mm, length 64 mm, width random) and aspen flakes (thickness 0.6 mm, length 38 mm, width random), immersing the flakes in liquid acetic acid anhydrate, and then maintaining the flakes in liquid acetic acid anhydrate for a period of 2 hours at a temperature of 120° C. (Journal of Wood Chemistry and Technology, 6(3), 427–448, 1986).

In the acetylation processing techniques discussed above, the catalyst-free acetylation processes of wood chips or wood flakes were carried out in the liquid acetylating agent. In such cases, the processing temperature can be raise up to the boiling point of liquid acetic acid anhydrate at the highest (the boiling point of acetic acid anhydrate is 139° C.). Accordingly, the reaction rate cannot be raised, and a long processing period is necessary. Furthermore, another problem exists in: when a board is formed after acetylation, there is a persistent acetic acid odor because acetic acid remains in the wood chips or wood flakes.

Furthermore, A. D. Sheen conducted acetylation processing by immersing wood fibers in liquid acetic acid anhydrate and then maintaining these fibers in liquid acetic acid anhydrate for a period of 2 hours at a temperature of 120° C., in order to obtain acetylated wood fiber on a commercial scale (Chemical Modification of Lignocellulosics, 7–8 Nov. 1992, Rotorua, New Zealand).

However, because liquid phase acetic acid anhydrate was employed, the reaction rate could not be increased, and it was difficult to raise the degree of acetylation in a short period of time, as stated above. Furthermore, when wood fiber was subjected to acetylation processing in liquid acetic acid anhydrate, the acetic acid anhydrate reacted with substances in wood fibers and were then converted to acetic acid, contaminants escaped from the wood fibers into the acetic acid anhydride, and thereby, the acetic acid anhydride became unfit for use after a single use in acetylation processing, so that a large amount of wasted chemicals was generated. Further, Sheen converted a large-scale plant for acetic acid anhydrate production so as not to generate wasted chemicals; however, it is not a simple matter to provide such a plant, and the provision of such a plant involves enormous costs.

The Rowell's paper (Nordic Pulp and Paper Research Journal No. 2/1986) mentioned above conducted catalyst-free acetylation processing by exposing previously dried wood chips having a thickness of approximately 1 mm and a maximum length of 25 mm to vaporized acetic acid anhydrate, and then maintaining these chips for a period of from 4 to 48 hours at a temperature of 120° C.

Rowell and Youngquist, et. al., conducted catalyst-free acetylation processing by exposing wood flakes to a vapor phase acetic acid anhydrate at a temperature of 140° C. for a period of 4 hours. After this 4-hour acetylation processing, the wood flakes exhibited a 15 weight percent gain (WPG). However, the degree of acetylation could not be raised even if the temperature of the acetic acid anhydrate was raised and acetylation processing was conducted for a long period of time.

Harada (Proceedings of the International Symposium on Chemical Modification of Wood, May 17–18, 1991, Kyoto, Japan) subjected a veneer (width: 75 mm, thickness: 2 mm, length: 75 mm) acetylation processing in vapor phase. In this case in which acetylation processings were conducted in two ways. in one way, it was conducted without preprocessing with a catalyst, then an acetylation degree from 14 to 17% was realized by maintaining the veneer for a period of 1 to 2 hours at a temperature of 140° C. However, the reaction rate was low and furthermore, the degree of acetylation was insufficient. In the other way, Harada simultaneously disclosed an acetylation process by immersing the veneer in a catalyst (potassium acetate) and then maintaining the veneer at a temperature of 140° C. for a period of from 40–90 minutes. A degree of acetylation was 20 WPG. However, because a catalyst was used, the number of processes increased. Furthermore, as catalyst are remaining in the veneer after acetylation process, an acetic acid odor was generated.

Nishino conducted acetylation processing by exposing wood particles (small specimen: 30 mm×26 mm×5 mm) to acetic acid anhydrate vapor (Journal of the Japan Wood Research Society, Volume 37, No. 4, pages 370–374, 1991). However, because the wood particles were acetylated in the vapor phase, the reaction rate was low, and a long period of time was required to obtain the desired acetylation degree.

The various vapor phase acetylation processing methods for wood particles described above exhibited results which were inferior to those exhibited by liquid phase acetylation processing.

SUMMARY OF THE INVENTION

It is an object of the present invention to provide efficient acetylation processing method which overcomes the problems of the conventional processing methods and which is capable of processing in a short period of time, which could not be realized by conventional methods for the acetylation of wood fiber in the vapor phase, and to provide a method for the manufacture of modified wood such as wood fiber boards, or the like, which have superior moisture resistance.

The manufacturing method for wood board in accordance with the present invention comprises a process for the production of wood fibers by means of the fiberization of wood, a process for providing a vapor phase acetylating agent, a process for acetylating wood fibers in the vapor phase acetylating agent, and a process for accumulating and forming into a solid body of these acetylated wood fibers.

In the present invention, a chief characterizing feature is acetylating the wood fiber in a vapor phase. That is to say, the acetylating agent in the vapor phase is brought into contact with the wood fiber, and thus an acetylating reaction is conducted.

In the manufacturing method for wood board in accordance with the present invention, wood is fiberized, wood fibers thus obtained are acetylated in a vapor phase, and these acetylated wood fibers are accumulated, molded into a solid body, so that it is possible to produce wood board having low water absorption, and having superior resistance to moisture. Furthermore, as acetylating wood fiber is conducted in the vapor phase agent, in comparison with the case in which acetylation is conducted in a liquid phase agent, the amount of acetylating agent required can be greatly reduced, and acetylation can be completed in a short period of time, so that it is possible to keep production costs low. Furthermore, the modified wood obtained by means of the manufacturing method of the present invention is not marked by discolorations or aroma resulting from residual acetic acid.

In another aspect of the present invention, it is a further object to prevent the carbonization of the wood fiber during acetylation processing in a vapor phase. To accomplish this object, the present invention comprises a manufacturing method for wooden boards, comprising the steps of:

(a) generating wood fibers by fiberizing wood;
(b) supplying an acetylating agent in the liquid phase;
(c) mixing liquid phase xylene with the acetylating agent;
(d) heating a resulting mixture and generating mixture vapor;
(e) exposing the wood fiber to the mixture vapor to acetylate the wood fiber; and
(f) molding the acetylated wood fiber using a resin binder.

DETAILED DESCRIPTION OF THE INVENTION

Figure 1:
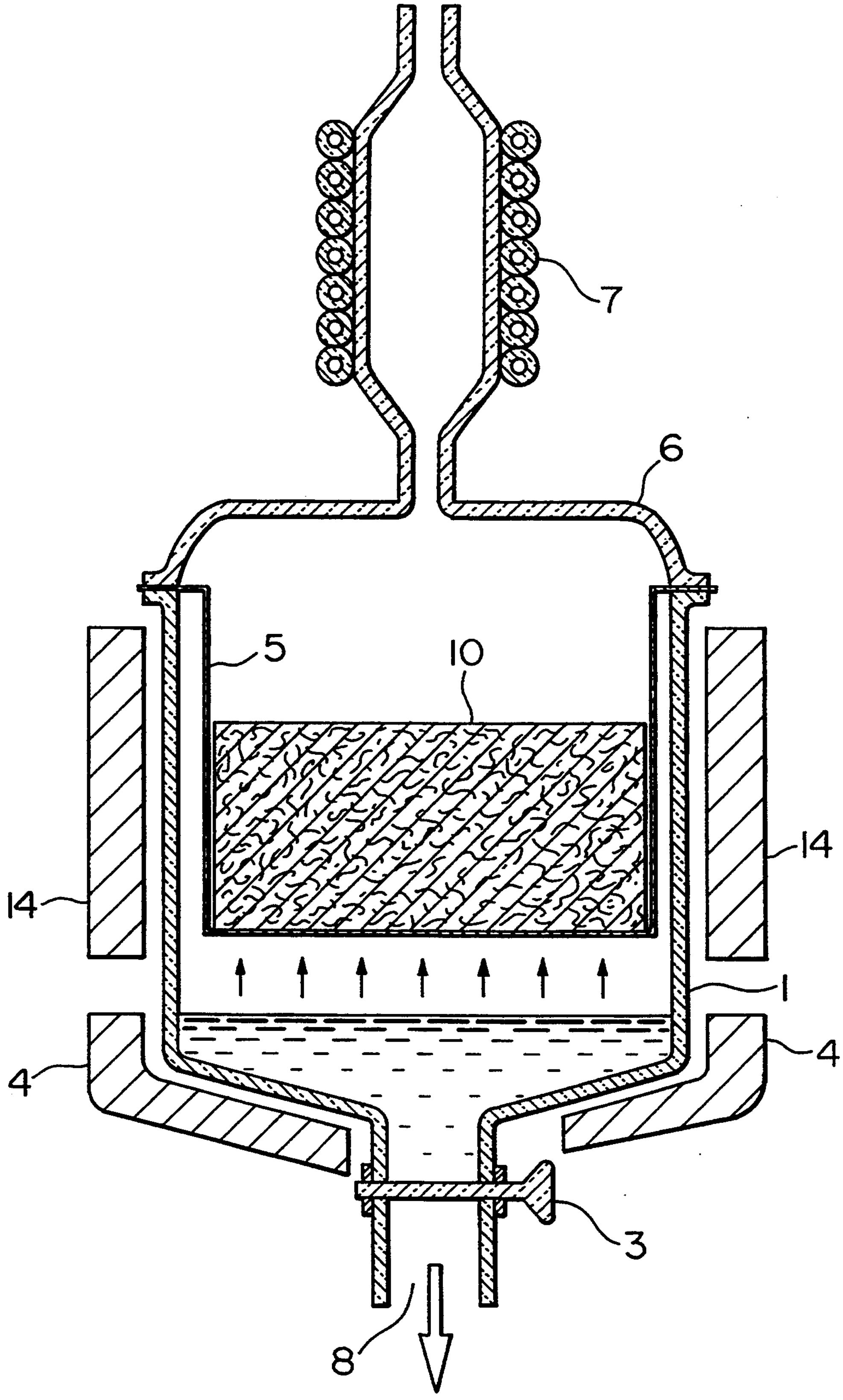
FIG. 1 is a view of the acetylation equipment preferable for the present invention.

The manufacturing method for wood board in accordance with the present invention comprises a process for producing of wood fibers by the fiberization of wood, a process for acetylating these wood fibers in a vapor phase, and a process for accumulating acetylated wood fibers and molding into a solid body.

First, lumber, such as conifer wood such as pine or cedar, or broadleaf wood such as Japanese beech or Japanese oak, is chipped in a chipper, and the chips thus obtained are fiberized. In this fiberization, a method may be employed in which, after steaming by means of high pressure steam, fiberization is conducted by means of a disc refiner. Furthermore, among wood fibers obtained by fiberization, those fiberized into powder form are removed, and those having a width (thickness) of 1 mm $\phi$ or less, and a length of 50 mm or less, are used. The reason for the selection of fibers of a particular thickness is so that the wood fibers will be efficiently acetylated in the vapor phase acetylating agent, for reasons which will be given in detail hereinafter.

Wood fibers produced by fiberization are in a state in which the fibers are not cut, but the microscopic structure of wood has been broken down. That is to say, vessels, tracheids and the like present among wood fiber have been destroyed, therefore only the wood fiber leave. In this way, wood fiber differ greatly from chip produced by chopping of wood log or flake produced by the shaving of chips by planes or the like. In such chip or flake, or in smaller chip or flake produced by the shaving thereof, the structure of wood is not broken down, and therefore they have not only wood fiber, but also vessels, tracheids and the like, are present.

Furthermore, it is preferable that wood fiber thus fiberized be oven-dried so that the water content thereof is 3% or less, and more preferably 1% or less, prior to acetylation.

Wood fibers which have been obtained in the above manner, are acetylated in a vapor phase. That is to say, an acetylation reaction is conducted by vaporizing an acetylating agent and subjecting the wood fiber to the vaporized agent. Acetic acid, acetic acid anhydrate, chloroacetic acid, and the like, may be used as the acetylating agent; among these, acetic acid anhydrate is preferable.

The inventor of the present invention considers that wood fiber is most preferable form of wood to acetylate wood material in vapor phase acetylating agent. The reason are as follows:

(a) The vapor phase acetylating agent will isotropically diffuse into wood fibers. Because wood fibers manufactured by a fiberization technique has little inter-layer structure such as a vessel and a tracheid. On the contrary, vessels or tracheid remain in wood flakes or wood chips, therefore, the acetylating agent tends to diffuse along mainly directions of fibers therein, whereas poorly diffuse perpendicular to directions of fibers, i.e., the diffusion into wood flakes or chips is anisotropic.

(b) The diffusion distance of the acetylating agent in wood fiber is shorter than that in wood flakes or wood chips. Therefore the vaporized acetylating agent can easily be diffused into wood fiber in spite of the following drawbacks of the acetylation process using a vapor phase acetylating agent: (1) lower molecule density of the acetylating agent in vapor phase than that in liquid phase which results in prolonged processing time; and (2) wood does not show microscopic swelling by vaporized chemical substances so that diffusion of chemical substances into wood cells is not accelerated.

Concrete methods of acetylating wood fiber in the vapor phase acetylating agent include the following method. For example, a lower portion of a reaction vessel 1 such as that shown in FIG. 1 is filled with acetic acid anhydrate or the like as an acetylating agent supply source, and above this, a net 5 comprising stainless steel wire or the like is suspended, and wood fiber 10 are placed on this net 5. Acetic acid anhydrate is heated by means of heater 4, and acetic acid anhydrate vapor is formed, and simultaneously therewith, heaters 14 surrounding net 5 are heated and wood fiber 10 and the acetic acid anhydrate vapor are brought into contact with wood fiber 10. The vessel has a cooler 6 in the upper part thereof; the acetic acid anhydrate vapor heated and vaporized by means of heater 4 is cooled by a reflux pipe 7 and liquified, and is thus returned to the reaction vessel 1. After the acetylation processing has been completed, when the liquid agent is to be discharged, a cock 3 is opened to discharge the agent from drain 8.

The reaction period of the acetylation reaction is within a range of 15 minutes to 3 hours; this can be appropriately adjusted in accordance with a degree of acetylation required.

In this acetylation reaction, if a reaction temperature is low, an acetylation degree (measured as a weight percent gain) becomes low, and when a reaction temperature is too high, wood fiber may be carbonized; in either case, such fibers are unsuitable for use as raw material for wood board. Accordingly, a reaction temperature (the temperature in wood fiber mass) is preferably within a range of 120°–160° C. Furthermore, acetylating agent vapor is convecting within the outer side of the wood fiber mass on the net 5, so that the upper limit of the reaction temperature is essentially fixed. The reaction pressure is within a range of from one to two atm.

As explained above, the wood fibers which have been acetylated in a vapor phase acetylating agent as explained above are washed in cold or hot water so as to remove the acetylating agent still adhering thereto, and then these fibers are oven-dried so as to attain a predetermined moisture content. Next, these acetylated wood fibers are assembled and solidified, and modified wood having a freely chosen shape, such as that of a board or column, is molded.

This accumulation and solidification is conducted by coating a binder comprising a synthetic resin binder (for example, urea resin, phenol resin, melamine resin, urethane resin, or the like) to the surface of the acetylated wood fibers in such an amount as to be within a range of 5–30% with respect to the solidified wood and binder, filling a mold therewith, applying pressure from above the mold, maintaining an elevated temperature state within a range of 150°–200° C. (for a period of approximately 1 minute per 1 mm of thickness), and curing.

The modified wood produced in this manner uses wood fibers which have been acetylated as a raw material, so that the resistance to moisture and water thereof is improved.

In the present invention, wood material decomposed to fibers (fiberized) is acetylated in a vapor phase agent, so that acetylation can be accomplished in a short period of time. Additionally, acetylating agents such as acetic acid or the like do not remain within the wood material.

In the invention of the present application, by acetylating wood fibers in a vapor phase acetylating agent, following results are obtained:

(a) An acetylation time period becomes short. A ratio of surface area of wood fiber to the volume thereof is large so that, vapor phase acetylating agent easily diffuses into wood fiber although diffusion speed into wood is relatively low in an acetylation process in vapor phase compared to an acetylation process in liquid phase.

(b) Resultant substance such as acetic acid does not remain in wood fiber because catalyst such as acetate or the like is not used. Although the reaction rate temporarily declines without catalyst, wood fiber is sufficiently acetylated in vaporized acetylating agent because of the above mentioned reasons.

(c) Thickness swelling reduces more effectively, because a degree of acetylation becomes sufficient even wood fiber is acetylated in vaporized acetylating agent.

(d) As the material is wood fiber, diffusion distances from wood surface to the deepest point thereof is short. Thus, a drawback of using acetylating agent in vapor phase, i.e., the diffusion speed is low, is overcome. In the same manner, a problem of a method of acetylating wood flakes or wood chips, which is low diffusion speed in a direction perpendicular to grains, is resolved.

Furthermore, by acetylating wood fiber in a vapor phase acetylating agent, the amount of acetylating agent used can be reduced in comparison with the case in which acetylation process is conducted in the liquid phase. For example, in order to acetylate 60 g of wood fibers to an acetylation degree of approximately 20%, the amount of acetic acid anhydrate used for acetylation in the vapor phase is within a range of 50–70 ml, whereas in the liquid phase, 2000 ml of acetic acid anhydrate are necessary to conduct such acetylation. That is to say, by means of the use of the manufacturing method of the present invention, it is possible to greatly save on the amount of acetylating agent which must be used. Furthermore, the reaction is conducted in the vapor phase, and catalysts such as acetate or the like are not used (catalyst-free), so that the acetylating agent remaining in wood fiber after the reaction is very small in comparison with that remaining in the case of the reaction in the liquid phase, and the acetylating agent can be easily removed by washing with water, so that no acetic acid odor will be present in the modified wood manufactured in this manner.

EXAMPLES

Example 1

Wood was steamed and fiberized to produce wood fibers, and 60 g of completely oven-dried, long, fine fibers were prepared. 100 ml of acetic acid anhydrate was prepared as a supply source for acetylating agent. Acetic acid anhydrate was placed in the bottom of a 3-liter flask (corresponding to reference 1 in FIG. 1), the complete amount of the above-described wood fiber was placed in the flask, so as not to be immersed in the liquid acetylating agent, the flask was subsequently heated to a temperature of 140° C. by a heater (corresponding to reference 4 in FIG. 1), and reacted for 1 hour. Here, the acetylation degree is defined as a percentage indicating the increase in weight after acetylation of the wood fibers with respect to the weight of the wood fibers obtained by fiberization (weight percent gain).

After the reaction completes, the fiber was extracted, washed with hot water, and the fiber was oven-dried so as to reduce a water content down to 5%.

Next, a phenol resin binding agent which served as a binder was coated to these fibers, the fibers were placed in a mold, heat and pressure were applied to cure the binder, and a board-shaped molded product was obtained.

This molded product was stored for a period of 24 hours in water at a temperature of 25° C., and the thickness swelling resulting from water absorption was measured. The results are shown in Table 1.

Comparative Example 1

A comparative example is prepared with wood fiber without acetylating the wood fiber, and a board-shaped molded product was obtained in accordance with a method of accumulation and solidification described before. The thickness swelling of this product resulting from moisture absorption was evaluated by maintaining the molded product for a period of 48 hours at a temperature of 35° C. and at a RH (relative humidity) of 95%. The results are shown in Table 1.

TABLE 1

| | Acetylating Agent | Degree of Acetylation (%) | Thickness Swelling (%) |
|---|---|---|---|
| Example 1 | Acetic acid anhydrate 100 ml | 24.2 | +1.74 |
| Comparative Example 1 | None | — | +10.19 |

Example 2

As the first embodiment of the present invention, an example in which acetylation of wood fiber was conducted in the vapor phase using 100% acetic acid anhydrate was stated in Example 1. However, when acetylation is conducted in the vapor phase using 100% acetic acid anhydrate, the temperature of the reaction will become high, and the wood fiber may be sometimes carbonized. In such a case, in order to prevent the carbonization of wood fiber, xylene may be mixed with acetic acid anhydride, and acetylating wood fiber in the vaporized mixture (in the vapor phase).

As the second embodiment, 60 g (completely oven-dried) of long and fine wood fibers obtained by steaming and fiberizating wood were prepared. The mixture of acetic acid anhydrate and xylene shown below were prepared as supply sources of the acetylating agent.

(a) Acetic acid anhydrate 70 ml, xylene 30 ml (proportion of xylene 30%)

(b) Acetic acid anhydrate 50 ml, xylene 50 ml (proportion of xylene 50%)

(c) Acetic acid anhydrate 30 ml, xylene 70 ml (proportion of xylene 70%)

These were each placed in the bottom of a 3-liter separatory flask corresponding to reference numeral 1 in FIG. 1, the complete amount of the above-described wood fiber was placed in the flask, so as not to be immersed in the acetylating agent, the flask was subsequently heated to a temperature of 140° C. by a heater corresponding to reference numeral 4 in FIG. 1, and reacted for a period of 1 hour.

After the reaction completed, the fiber was extracted, washing with hot water was conducted, and the fibers were oven-dried so as to reach a water content of 5%.

Next, a phenol resin binding agent which served as a binder was coated to these fibers, the fibers were placed in a mold, heat and pressure were applied to cure the binder, and a board-shaped molded product was obtained.

This molded product was stored for a period of 24 hours in water at a temperature of 25° C., and the thickness swelling resulting from water absorption was measured. The results thereof are shown in Table 2.

Figure 2:
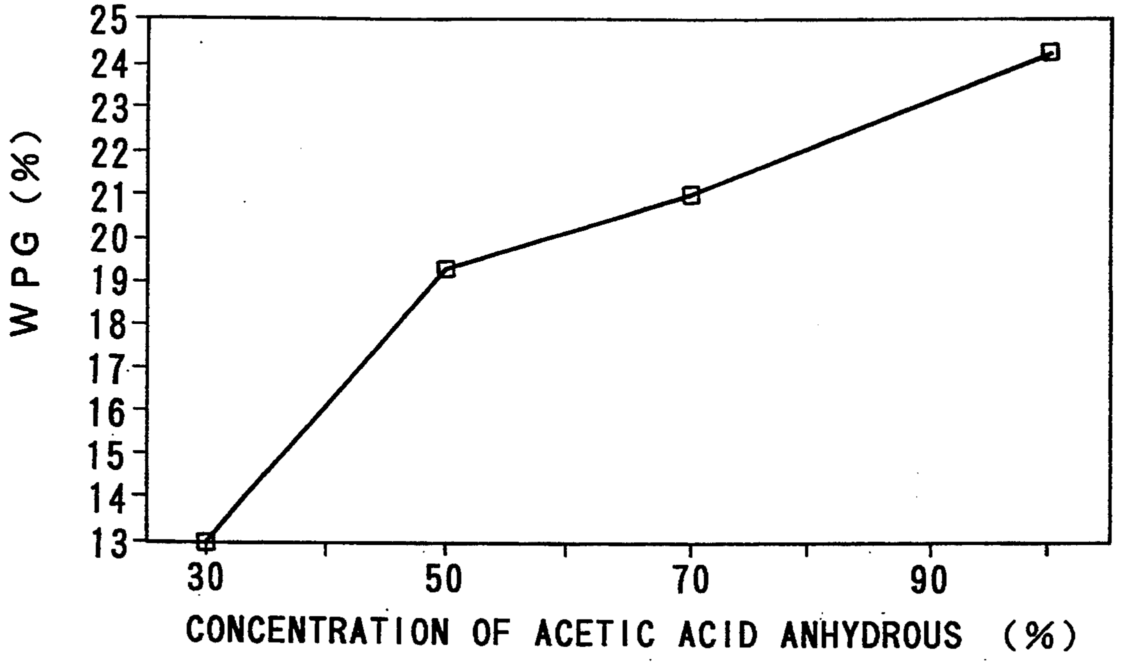
FIG. 2 is a graph indicating the relation between the concentration of xylene and the acetylation degree.
Figure 3:
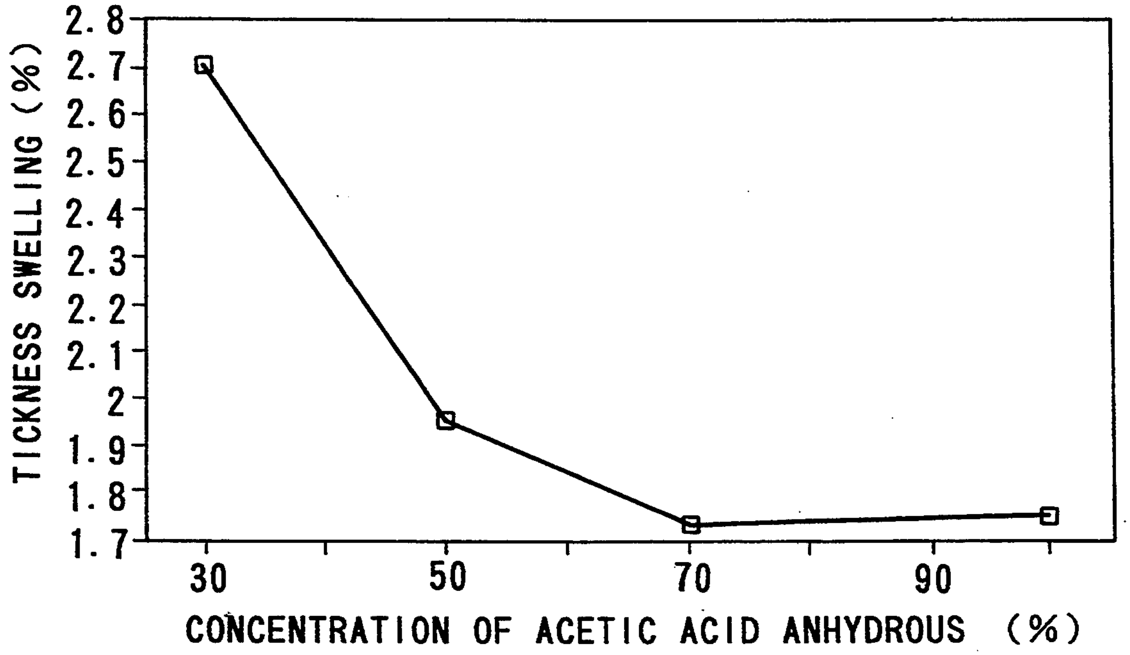
FIG. 3 is a graph indicating the relation between the concentration of xylene and the thickness swelling.
Figure 4:
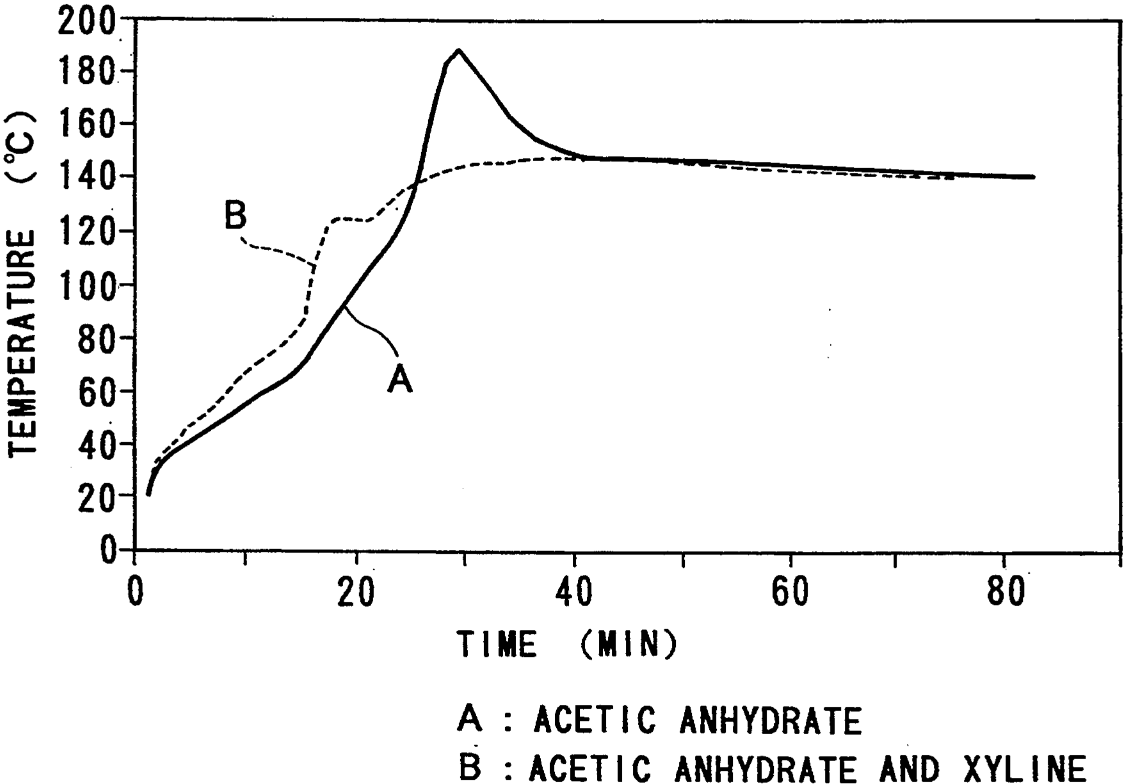
FIG. 4 is a graph indicating the change of temperature of wood fiber over the acetylating process.

Furthermore, the acetylation degree and the thickness swelling with respect to the first and second Examples is shown in FIGS. 2 and 3, respectively. In order to increase the moisture resistance, it is necessary that the acetylation degree reach a level of approximately 20%; however, as can be seen in FIG. 2, even when xylene was mixed with acetic acid anhydrate, when the proportion of xylene was approximately 50% or less, it was observed that a degree of acetylation reached at approximately 20% (19.3%) within 1 hour, and it was thus discovered that it is possible to achieve sufficient acetylation processing if the proportion of xylene to the whole content of the mixture is approximately 50% or less. Accordingly, even if the proportion of xylene is approximately 50% or less in order to prevent the carbonization of the wood fibers, it is possible to achieve the object of the present invention, that is to say, the realization of a high degree of acetylation in a short period of time. Furthermore, in the case in which the wood fibers thus obtained are used to produce board-form molded products by means of the method described above, if the proportion of xylene to the whole content of the mixture is 50% or less, the thickness swelling will not exceed 2%, and such a product is thus sufficiently suitable for use as a molded product. Accordingly, the object of the improving the moisture resistance of the molded product has been achieved.

The reason for mixing xylene with the acetic acid anhydrate is that, in the vapor phase, xylene functions as a coolant with respect to acetic acid anhydrate. Using the apparatus shown in FIG. 1, wood fiber is acetylated. The change over time of the temperature of wood fiber 10 within the net 5 of FIG. 1, is shown. The temperature, which 100% acetic acid anhydrate was used as the acetylating agent, is indicating in a solid line. The temperature, which a mixture of acetic acid anhydrate and xylene (proportion of xylene, 33% to the whole content of the mixture) was used, is indicating in a dotted line.

In the case that 100% acetic acid anhydrate was used, the temperature rose quickly to approximately 190° C. in approximately 30 minutes after the initiation of heating, and a temperature-increase-peak thus appeared. The vaporized acetylating agent vapors have a tendency to remain within the wood fiber mass, and thus this heating effect is thought to occur as a result of the accumulation of the heat of reaction generated during acetylation. When the temperature exceeds approximately 200° C., the wood fibers carbonize even if oxygen is not present.

On the other hand, in the case in which a mixture of acetic acid anhydrate and xylene is used, the temperature increase during the initiation of acetylation has a greater temperature slope over time when compared to the case in which 100% acetic acid anhydrate was used; however, no temperature-increase-peak is present, and thus it is possible to prevent an excessive increase in temperature. Accordingly, it is possible to restrict the occurrence of carbonization.

The function of the xylene which is added in the case in which wood fibers are acetylated in the liquid phase acetylating agent differs greatly from the function in the case in which liquid acetic acid anhydrate is diluted with xylene. That is to say, xylene is used simply to dilute the acetic acid anhydrate, and does not perform the functions of cooling and suppression of heat generation as a result of the acetylation reaction. The reason for this is that in the case in which acetylation processing is conducted in the liquid phase, the heat capacity of the liquid is larger than that of the vapor, so that the heat generated is absorbed by the liquid itself, and even if the liquid is heated, the temperature will not rise above the boiling point (139° C.) of the acetic acid anhydrate, so that an excessive increase in heat (approximately 200° C.) will not occur. As a result, if the liquid phase acetylation processing of wood fiber is conducted in 100% acetic acid anhydrate, the wood fibers will not carbonize.

TABLE 2

| Acetylating Agent | | Degree of | Thickness |
|---|---|---|---|
| Acetic acid anhydrate (ml) | Xylene (ml) | Acetylation (%) | Swelling (%) |
| 70 | 30 | 21.0 | +1.73 |
| 50 | 50 | 19.3 | +1.94 |
| 30 | 70 | 13.0 | +2.70 |

From these results, it can be seen that by means of the acetylation in the vapor phase, it is possible to obtain a high degree of acetylation while using a small amount of acetylating agent.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope off the invention.

What is claimed is:

1. A method for manufacturing a wood board, comprising subjecting wood to a fiberizing treatment to produce wood fibers wherein the microscopic structure of said wood has been altered, providing a vapor phase agent, acetylating the wood fibers in the vapor phase agent, and accumulating and molding the acetylated wood fibers into a solid body.

2. A method for manufacturing a wood board according to claim 1, wherein acetylation in the vapor phase is conducted by using a vapor supplied from an acetylating agent consisting of acetic acid anhydrate.

3. A method for manufacturing a wood board, comprising subjecting wood to a fiberizing treatment to produce wood fibers wherein the microscopic structure of said wood has been altered, providing a vapor phase acetylating agent comprising a mixture of acetic acid anhydrate and a solvent, acetylating the wood fibers in the vapor phase acetylating agent, and accumulating and molding the acetylated wood fibers into a solid body.

4. A method according to claim 3, wherein said solvent suppresses overheating of said wood fiber.

5. A method for manufacturing a wood board according to claim 3, wherein said solvent comprises xylene.

6. A method for manufacturing a wood board according to claim 5, wherein said xylene is contained in a mixture with acetic acid anhydrate so as to be present in an amount of less than 50% of the mixture.

7. A method for manufacturing a wood board, comprising the steps of:
- (a) subjecting wood to a fiberizing treatment to produce wood fibers wherein the microscopic structure of said wood has been altered;
- (b) supplying an acetylating agent in the liquid phase;
- (c) mixing liquid phase xylene with said acetylating agent;
- (d) heating a resulting mixture and generating mixture vapor;
- (e) exposing the wood fibers to said mixture vapor to acetylate wood fibers; and
- (f) molding said acetylated wood fibers using a resin binder.

8. A method for manufacturing a wood board according to claim 7, wherein said acetylating agent comprises acetic acid anhydrate.

9. A method for manufacturing a wood board according to claim 8, wherein said xylene is mixed at a mixing proportion of less than 50% with respect to the mixture.

10. A method for improving resistance to moisture of a wood board, comprising the steps of:
- subjecting wood to a fiberizing treatment to produce wood fibers wherein the microscopic structure of said wood has been altered;
- acetylating the wood fiber in an atmosphere comprising acetic acid anhydrate and a solvent in a vapor phase; and
- producing a wood board from the acetylated wood fibers.

11. A method according to claim 10, wherein said solvent suppresses overheating of said wood fiber.

12. A method according to claim 10, wherein said solvent comprises xylene.

13. A method according to claim 12, wherein the amount of said xylene is not more than the amount of said acetic acid anhydrate.

* * * * *